United States Patent
Cheriyan

(10) Patent No.: US 12,353,295 B2
(45) Date of Patent: Jul. 8, 2025

(54) SELECTIVE HIGH FREQUENCY BACKUP

(71) Applicant: Own Data Company Ltd, Tel Aviv (IL)

(72) Inventor: Thomas K. Cheriyan, Scarsdale, NY (US)

(73) Assignee: Own Data Company Ltd, Tel Aviv (IL)

( * ) Notice: Subject to any disclaimer, the term of this patent is extended or adjusted under 35 U.S.C. 154(b) by 106 days.

(21) Appl. No.: 17/577,983

(22) Filed: Jan. 18, 2022

(65) Prior Publication Data

US 2023/0229565 A1    Jul. 20, 2023

(51) Int. Cl.
*G06F 11/14*    (2006.01)

(52) U.S. Cl.
CPC ...... *G06F 11/1461* (2013.01); *G06F 11/1464* (2013.01); *G06F 2201/84* (2013.01)

(58) Field of Classification Search
CPC ............. G06F 11/1461; G06F 11/1464; G06F 2201/84
See application file for complete search history.

(56) References Cited

U.S. PATENT DOCUMENTS

| | | | |
|---|---|---|---|
| 7,509,468 B1 | 3/2009 | Dalal et al. | |
| 8,260,750 B1 | 9/2012 | Gugick et al. | |
| 8,959,058 B1* | 2/2015 | Kleinschnitz | ....... G06F 11/1458 707/661 |
| 10,606,705 B1* | 3/2020 | Janakiraman | ....... G06F 11/1464 |
| 10,936,435 B2 | 3/2021 | Natanzon et al. | |
| 11,108,859 B2 | 8/2021 | Das et al. | |
| 2012/0089572 A1 | 4/2012 | Raichstein et al. | |
| 2018/0189147 A1* | 7/2018 | Banasik | .............. G06F 11/2069 |
| 2019/0155695 A1 | 5/2019 | Protasov et al. | |
| 2020/0159624 A1 | 5/2020 | Malkov et al. | |
| 2020/0159634 A1* | 5/2020 | Gadgil | ................ G06F 11/2097 |

(Continued)

FOREIGN PATENT DOCUMENTS

EP    3538998    1/2021

OTHER PUBLICATIONS

Wikipedia.org [online], "Remote Backup Service," published on Oct. 1, 2021, retrieved on Nov. 10, 2021, retrieved from URL https://en.wikipedia.org/wiki/Remote_backup _service, 8 pages.

*Primary Examiner* — Tony Wu
(74) *Attorney, Agent, or Firm* — Fish & Richardson P.C.

(57) ABSTRACT

Methods, systems, and apparatus, including computer programs encoded on computer storage media, for selectively creating high frequency data backups. One of the methods includes maintaining configuration data that indicates a backup frequency at which backups are scheduled to be made for a database, and third party data that identifies one or more predicted events in a geographic area in which the database is physically located; determining, using the third party data, whether a predicted likelihood that the database will experience data loss during a future time period satisfies a threshold likelihood; in response to determining whether the predicted likelihood satisfies the threshold likelihood, selectively changing the backup frequency in the configuration data to be a second, different value that is different than a first value or determining to skip updating the backup frequency; and initiating, using the backup frequency, a backup of at least a second portion of the database.

20 Claims, 2 Drawing Sheets

(56) References Cited

U.S. PATENT DOCUMENTS

| | | |
|---|---|---|
| 2021/0049075 A1 | 2/2021 | Gibbons et al. |
| 2021/0049077 A1* | 2/2021 | Gibbons, Jr. ....... G06F 11/3058 |
| 2021/0248041 A1* | 8/2021 | Yan .................... G06F 11/3051 |
| 2023/0056105 A1* | 2/2023 | Smith .................. G06F 3/0619 |

* cited by examiner

SELECTIVE HIGH FREQUENCY BACKUP

BACKGROUND

Various systems can create backups of the data stored on the system. For instance, a system that includes a database can backup data from the database. This can include storing data from the database on multiple memories.

SUMMARY

In general, one aspect of the subject matter described in this specification can be embodied in methods that include the actions of maintaining, by a first system, i) configuration data that indicates a backup frequency at which backups are scheduled to be made for at least a first portion of a database included in a second system, the backup frequency having a first value, and ii) third party data that identifies one or more predicted events in a geographic area in which the second system is physically located; determining, using the third party data, whether a predicted likelihood that the database will experience data loss during a future time period satisfies a threshold likelihood and the first system should change the first value for the backup frequency to a second, different value; in response to determining whether the predicted likelihood satisfies the threshold likelihood, selectively changing the backup frequency in the configuration data to be the second, different value that is different than the first value or determining to skip updating the backup frequency; and after selectively updating the backup frequency or determining to skip updating the backup frequency, initiating, using the backup frequency, a backup of at least a second portion of the database.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method can include determining the second, different value for the backup frequency at which backups will be scheduled to be made during the future time period after which time period the backup frequency will revert to the first value. The second, different value can indicate a different backup frequency than the first value. Initiating the backup can include initiating, using the backup frequency that has the second, different value, the backup of at least the second portion of the database.

In some implementations, the method can include determining that the future time period has ended; and in response to determining that the future time period has ended, changing the backup frequency in the configuration data to the first value. The method can include determining, using the third party data, that the predicted likelihood that the database will experience data loss during the future time period satisfies the threshold likelihood. Determining the second, different value can be responsive to determining that the predicted likelihood satisfies the threshold likelihood.

In some implementations, determining whether the predicted likelihood satisfies the threshold likelihood can include determining, using the third party data, the second, different value. The method can include determining, using the third party data, a predicted rate of data change to the database during the future time period; and determining that the predicted rate of data change satisfies a rate of data change threshold. Determining the second, different value can be responsive to determining that the predicted rate of data change satisfies the rate of data change threshold.

In some implementations, the first value can indicate a first schedule at which backups are made less frequently than a second schedule indicated by the second, different value. Initiating the backup can include initiating the backup of at least the second portion of the database that includes the first portion of the database.

The subject matter described in this specification can be implemented in various embodiments and may result in one or more of the following advantages. In some implementations, the systems and methods described in this specification can reduce network usage, usage of one or more other computer resources, or a combination of both, by changing a database's backup frequency when a predicted event might occur in a geographic area that includes the database. For instance, the systems and methods can have a higher backup frequency when a predicted event might occur, reducing network usage, memory usage, or both, during other time periods. The systems and methods can have a lower backup frequency when a predicted event might occur, reducing network usage, memory usage, or both, during this time period. Other computer resources can include memory, processor cycles, or both. In some implementations, the systems and methods described in this specification can reduce database downtime by dynamically changing the database's backup frequency when a predicted event might occur in a geographic area that includes the database. For example, when a backup frequency is dynamically increased during a time period that includes the predicted event, the systems and methods described in this specification can reduce a downtime of a database when the predicted event causes an outage of the system that includes the database, e.g., less data might be lost than would occur otherwise.

In some implementations, dynamically changing a database's backup frequency for a time period for which a predicted rate of change to data satisfies a threshold value can reduce an amount of data that might be lost if the system goes down. For instance, the systems and methods described in this specification can use historical database access data, e.g., historical database write access data, to determine the time period. The systems and methods described in this specification can then dynamically change, e.g., increase or decrease, the backup frequency for the time period.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Some systems backup their data to remote systems, such as a remote cloud computing system. For instance, an entity can store data on a first cloud computing system or on their own servers and backup some of all of their data to the remote cloud computing system, e.g., that is a separate system from the first cloud computing system.

Remotely backing up data takes time and uses computer resources, such as network bandwidth, memory, and processor cycles. For instance, copying data from a source to a remote backup can require one or more computers to retrieve the data from the source, format the data for transmission across a network, and then send the formatted data to the remote cloud computing system. The retrieval and formatting can use memory and processor cycles.

Because of the computer resources involved in backing up data, systems sometimes perform remote backups less frequently than they would in an ideal situation, e.g., than they would if backups could be performed instantaneously. For instance, a system can be backed up once a week or once a day even though data on the system changes throughout any particular day.

To improve a frequency at which remote backups are performed, a system can predict when to backup data from a database. For example, the system can analyze historical data for the database, third party data, e.g., weather data for a physical area that includes the database, or both, to determine when to dynamically perform additional backups. This can include the system determining that historical data indicates that there is at least a threshold likelihood of an increase in data changes for the database and performing more frequent backups. In some examples, the system can determine that weather data, or other third party data, indicates that there is at least a threshold likelihood that there will be an increase in a number of data changes for the database, an increased likelihood of a database outage, or both, and performing more frequent backups.

Figure 1:
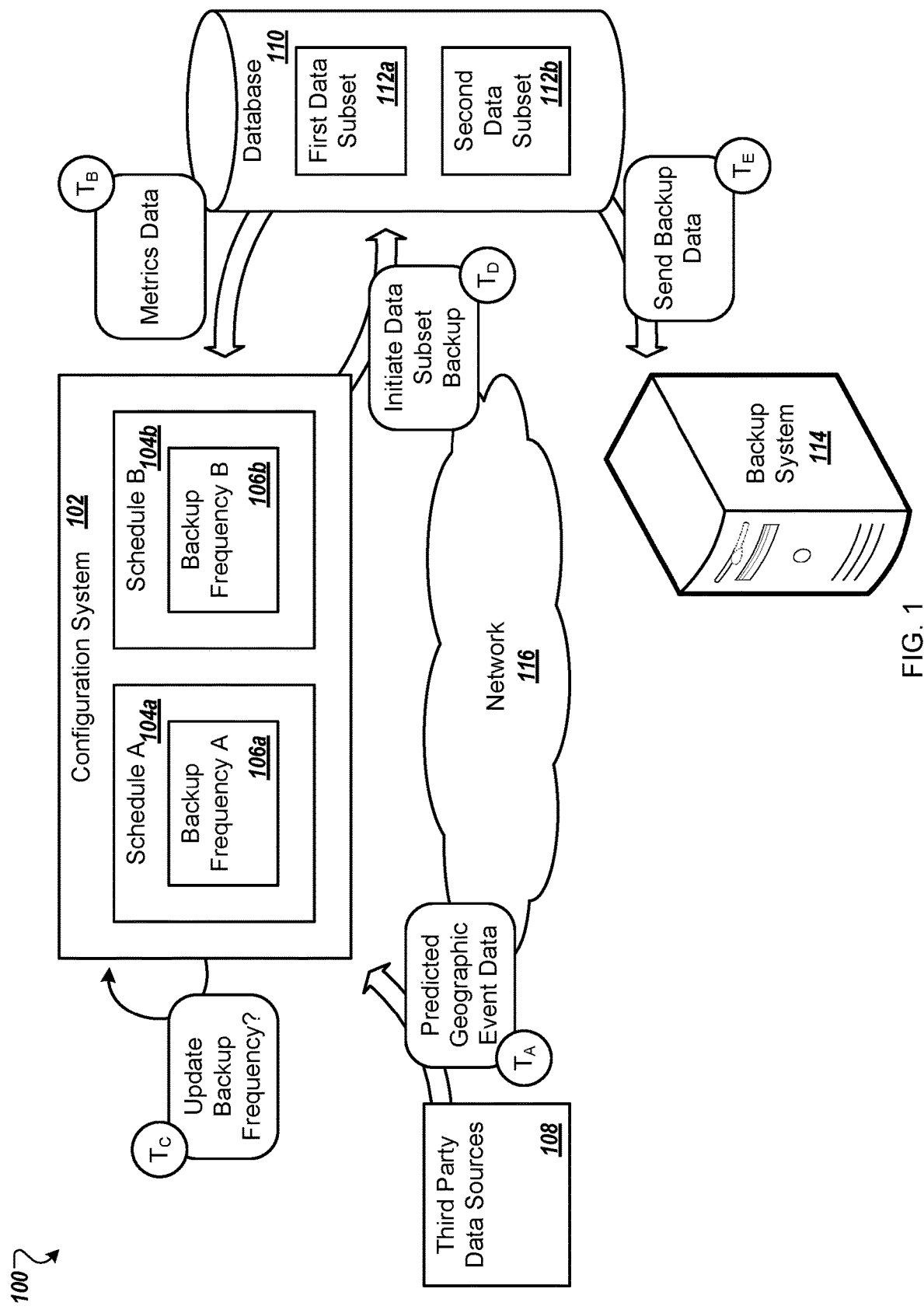
FIG. 1 depicts an example environment in which a configuration system dynamically determines whether to change a backup frequency at which data on a database is backed up.

FIG. 1 depicts an example environment 100 in which a configuration system 102 dynamically determines whether to change a backup frequency at which data on a database 110 is backed up. The change to the backup frequency can be an increased or a decreased frequency.

The configuration system 102 can maintain configuration data that indicates one or more schedules A-B 104a-b. The schedules A-B 104a-b can be different schedules for backing up data from the database 110, another database, or a combination of both, to a backup system 114, e.g., a cloud computing system. Each of the schedules A-B 104a-b can include a corresponding backup frequency A-B 106a-b. The backup frequencies A-B 106a-b have different values. For instance, the schedule A 104a can have a backup frequency A 106a with a first value, e.g., weekly, and the schedule B 104b can have a backup frequency B 106b with a second, different value, e.g., hourly.

During time period $T_A$, the configuration system 102 can receive predicted geographic event data from one or more third party data sources 108. The third party data sources 108 can be any appropriate data sources, such as weather data sources, government data sources, seismic event data sources, news data sources, other appropriate data sources, or a combination of two or more of these. When the configuration system 102 receives the predicted geographic event data, the backup system 114 can backup the database 110 according to the schedule A 104a.

The third party data sources 108 can be separate systems from the configuration system 102, the database 110, the backup system 114, or a combination of these. For instance, the third party data sources 108 can include a weather data source system that is a separate system from the configuration system 102 and the database 110.

The predicted geographic event data identifies a physical geographic location and indicates an event that might occur at the physical geographic location. The identification of the physical geographic location can be any appropriate type of data. For instance, the identification of the physical geographic location can include a region, e.g., the southern U.S., a city, a country, a county, a zip code, an address, or a combination of two or more of these.

The event can be a weather event such as a weather pattern, a natural disaster, a terrorist attack, or another appropriate event during which data on the database 110 might be lost. The predicted geographic event data might not include metrics data for the database 110.

In some implementations, during the time period $T_B$, the configuration system 102 can receive metrics data from the database 110. The metrics data can be any appropriate metrics data. For instance, the metrics data can indicate a rate of change for a first data subset 112a, a second data subset 112b, or both, that indicates a rate at which data, e.g., on average, in the subset is changed, new data is added, old data is deleted, or a combination of these.

The metrics data can include multiple rates of change for different time periods. For instance, the metrics data can indicate a first rate of change for the first data subset 112a during a first time period and a second rate of change for the first data subset 112a during a second, different time period.

In some examples, the metrics data can indicate rates of change for different time periods for different data subsets 112a-b. For instance, the metrics data can have two rates of change for two different time periods for the first data subset 112a and one rate of change for one time period for the second data subset 112b. The one time period can include the two different time periods, e.g., be a combination of the two different time periods. The one time period can at least partially overlap with the two different time periods or not overlap at all.

During time period $T_C$, the configuration system 102 can determine whether to update a backup frequency for the database 110 using the received predicted geographic event data. The configuration system 102 can determine whether to update the backup frequency using a predicted data loss likelihood, a predicted updated rate of change, or both. For example, the configuration system 102 can use the predicted geographic event data to determine a predicted likelihood that the database 110 will experience a data loss. The configuration system 102 can compare the predicted likelihood with a threshold likelihood to determine whether the database is likely to experience a data loss, e.g., during the event.

The predicted likelihood can satisfy the threshold likelihood, e.g., be greater than or equal to or either, when the configuration system 102 determines that the event might cause damage to at least a portion of the database 110, e.g., the one or more computers that implement the database, at least a portion of a network 116 that connects to the database 110, or both.

In some examples, the configuration system 102 can determine the predicted likelihood that indicates a likelihood that a rate of change to the database 110 might change during the event. For instance, when the database 110 is for an emergency system, such as a hospital or an emergency dispatch system, the configuration system 102 can determine the predicted likelihood that indicates that the emergency system will likely have a higher rate of change to the database 110 during the predicted geographic event, such as a hurricane, tornado, or ice storm.

In some implementations, the configuration system 102 can determine the predicted likelihood that represents both a likelihood that the database 110 will experience a data loss and a likelihood that a rate of change to the database 110 might change. The configuration system 102 can determine whether to predict the likelihood that represents one or both values using the predicted geographic event data, or any other appropriate process.

The configuration system 102 can include a machine learning model that determines the predicted likelihood. The configuration system 102 can train the machine learning model using predicted geographic event data, data that indicates whether one or more databases in the corresponding physical geographic area experienced a data loss, e.g., caused by the event, a rate of change for databases in the corresponding physical geographic area, or a combination of two or more of these. For instance, the configuration system 102 can make a live prediction for the predicted likelihood, receive feedback after the event that indicates whether corresponding data for databases in the physical geographic area was lost, and then train the machine learning model using the received feedback and the predicted likelihood.

The machine learning model can receive, as input, the predicted geographic event data. For example, the configuration system 102 can receive the predicted geographic event data and format the predicted geographic event data for use as input to the machine learning model. When the predicted geographic event data is unstructured, the configuration system 102 can use the unstructured predicted geographic event data to generate structured data and provide the structured data as input to the machine learning model.

The machine learning model can output the predicted likelihood. For instance, the machine learning model can output a single value that indicates the predicted likelihood. In some examples, the machine learning model can output two or more values, e.g., a vector. A first value in the two or more values can indicate the predicted likelihood. A second value in the two or more values can indicate whether the predicted likelihood indicates a likelihood of data loss, a likelihood of a rate of change to the database 110, or both.

In some examples, the machine learning model can output the backup frequency. For instance, the machine learning model can receive input for the predicted geographic event data and output a backup frequency based on the input data. The input data can also include data for the database 110, e.g., the metrics data.

The configuration system 102 can then use the output frequency as the predicted likelihood and the original backup frequency as the threshold likelihood. In these examples, the output frequency does not satisfy the original backup frequency when both frequencies are the same or within a threshold distance of each other, e.g., in which case the configuration system 102 will not change the backup frequency. The output frequency satisfies the original backup frequency when the two values are different or are different by at least the threshold distance. When the output frequency satisfies the original backup frequency, the configuration system 102 can use the output frequency as the value for the backup frequency A-B 106*a-b*.

When the configuration system 102 determines that the predicted likelihood satisfies the threshold likelihood, the configuration system 102 can switch from the schedule A 104*a* to the schedule B 104*b* for the database 110, or at least a data subset of the database 110. This can include the configuration system 102 switching from a first value for the backup frequency A 106*a*, e.g., weekly, to a second, different value for the backup frequency B 106*b*, e.g., hourly.

The second, different value for the backup frequency B 106*b* can indicate that the database 110 should perform backups more frequently than the database 110 would using the first value for the backup frequency A 106*a*. This can occur when the likelihood of data loss is high, the rate of change to the database 110 will likely increase, e.g., compared to a current rate of change, or both.

In some examples, the second, different value for the backup frequency B 106*b* can indicate that the database 110 should perform backups less frequently than the database 110 would using the first value for the backup frequency A 106*a*. This can occur when the likelihood of data loss is low, the rate of change to the database will likely decrease, e.g., compared to a current rate of change, or both. For instance, the configuration system 102 can determine to change the backup frequency A 106*a* with a value indicating daily backups to the backup frequency B 106*b* with a value indicating weekly backups.

The configuration system 102 can select a schedule, a value for a backup frequency, or both, using a result of whether the predicted likelihood satisfies the threshold likelihood. For instance, the configuration system 102 can select the schedule A 104*a* in response to determining that the predicted likelihood does not satisfy the threshold likelihood, e.g., and maintain the backup frequency the same as it was when the predicted geographic event data was received.

The configuration system 102 can select the schedule B 104*b* in response to determining that the predicted likelihood satisfies the threshold likelihood, e.g., and change the backup frequency to a different value from the frequency used when the predicted geographic event data was received. This can include generation of the schedule B 104*b*, e.g., the value for the backup frequency B 106*b*. The configuration system 102 can generate the value for the backup frequency B 106*b* using metrics data for the database 110, the predicted geographic event data, other appropriate data, or a combination of two or more of these.

During time period $T_D$, the configuration system 102 can initiate backup of a data subset on the database 110. The configuration system 102 can initiate the backup using either the schedule A 104*a* or the schedule B 104*b*. For instance, the configuration system 102 can initiate the backup using the schedule A 104*a* when the predicted likelihood does not satisfy the threshold likelihood, e.g., is less than or equal to or either, the threshold likelihood. The configuration system 102 can initiate backup using the schedule B 104*b* when the predicted likelihood satisfies the threshold likelihood, e.g., is greater than or equal to or either.

The configuration system 102 can initiate the backup using any appropriate process. For instance, the configuration system 102 can select one of the two schedules A-B 104*a-b* and provide data for the selected schedule A-B 104*a-b* to the database 110. This can include the configuration system 102 providing the value for the corresponding backup frequency A-B 106*a-b* to the database 110. The selected schedule is the schedule currently used for backing up the database 110.

In some examples, when the configuration system 102 determines to skip changing the backup frequency A-B 106a-b, e.g., and the corresponding schedule A-B 104a-b, the configuration system 102 can determine to not provide data for the original schedule, e.g., the schedule A 104a, to the database 110. For example, the configuration system 102 can determine that the database 110 does not need data for the schedule A 104a since backups are already being performed using the schedule A 104a. In some examples, instead of or in addition to determining to skip changing the backup frequency, the configuration system 102 can determine to maintain the current backup frequency.

In some implementations, the configuration system 102 can initiate the backup by providing instructions to the database 110, to the backup system 114, or both, to cause the database 110 to perform a backup according to the selected schedule A-B 104a-b. For instance, the configuration system 102 can use an application programming interface ("API") or another appropriate instruction, included in a message sent to the database 110, to cause the database 110 to initiate the backup.

In response to the initiation of the data subset backup, the database 110 can backup one or more data subsets 112a-b to the backup system 114 during time period $T_E$. During the backup process, the database 110, or a system that includes the database 110, can use any appropriate process to backup the one or more data subsets 112a-b. The backup process can include sending data from the one or more data subsets 112a-b through a network 116 to the backup system 114.

The configuration system 102 can initiate backup of a subset of the database 110, e.g., the first data subset 112a, the second data subset 112b, or both. For instance, during the initiation process, the configuration system 102 can send a message to the database 110 that indicates the one or more data subsets that should be backed up. The message can include an identifier for the first data subset 112a, the second data subset 112b, or both.

In some examples, the schedule A 104a can be for the first data subset 112a. The configuration system 102 can determine whether to update the backup frequency A 106a for the first data subset 112a or another data subset on the database, e.g., the second data subset 112b. The other data subset can be any appropriate data subset. For example, the second data subset 112b can include the first data subset 112a, in whole or in part. The second data subset 112b can be a proper subset of the first data subset 112a. The second data subset 112b can be a separate data subset from the first data subset 112a for which the configuration system 102 has the schedule A 104a. In these examples, the configuration system 102 can generate the schedule B 104b for the second data subset 112b while the schedule A 104a is used to backup data from the first data subset 112a.

The data subset for which the configuration system 102 determines to update the backup frequency, e.g., the second data subset, can be a data subset with data that is most commonly used, most important, or both.

In some implementations, the configuration system 102 can determine whether to update a backup frequency for multiple different databases 110. Each of the multiple different databases 110 can be in the same geographic area. Some of the multiple different databases can be in different geographic areas.

When the configuration system 102 receives predicted geographic event data for a physical geographic area that includes multiple databases 110, the configuration system 102 can determine whether to update backup frequencies for all of the multiple databases or some of the multiple databases 110. For instance, the configuration system 102 can use the predicted geographic event data, metrics data from respective databases 110, data types for respective databases 110, or a combination of two or more of these, to determine updated backup frequencies for the databases.

In this way, the configuration system 102 can determine to update a first backup frequency for a first database, to maintain a second backup frequency the same for a second database, and to update a third backup frequency for a third database. The first backup frequency, the second backup frequency, the third backup frequency, or a combination of these, can have the same values or different values before the configuration system 102 determines whether to update the corresponding frequencies. The first backup frequency and the third backup frequency can have the same or different values after the configuration system 102 determines to update the two frequencies. In some examples, the second backup frequency can be the same as the value of the first backup frequency, the third backup frequency, or both, after the configuration system 102 determines to update the first backup frequency and the second backup frequency.

By determining different backup frequencies for different databases in a physical geographic area, the configuration system 102 can reduce an amount of computational resources required for database backups, e.g., by increasing the amount used for only those databases that are most important.

In some implementations, the configuration system 102 can determine whether to update a backup frequency using the metrics data. For instance, the configuration system 102 can analyze the metrics data to determine a line that represents the metrics, e.g., over time. The configuration system 102 can analyze the line to determine one or more peaks on the line that indicate changes to the metrics data. The peaks can indicate a rate of change of data in the database 110, a rate of data access for data in the database 110, or both.

The configuration system 102 can use the peaks to determine whether to update a backup frequency. For instance, the configuration system 102 can determine to update the backup frequency to create more frequent backups when a number of peaks within a time period satisfies a threshold quantity, when a size of a peak satisfies a threshold size, or both. The configuration system 102 can determine to update the backup frequency to create less frequent backups when a number of peaks within a time period does not satisfy the threshold quantity, when the size of a peak does not satisfy the threshold size, or both.

In some examples, the configuration system 102 can perform this analysis by determining one or more valleys in the metrics data. The configuration system 102 can analyze valleys instead of or in addition to analyzing the peaks. The configuration system 102 can perform similar, but reverse, analysis for detected valleys in the metrics data, compared to the analysis for detected peaks.

The backup can be any appropriate type of backup. For instance, the backup can be a full backup in which all data from the corresponding data subset 112a-b is copied to the backup system 114. The backup can be a synthetic backup in which only data that has changed since a reference backup is copied to the backup system 114. The reference backup can be the most recent backup, a backup performed periodically, e.g., once a week, or another appropriate backup.

The configuration system 102, the third party data sources 108, the database 110, the backup system 114, or a combination of these, can each be an example of a system implemented as computer programs on one or more computers in one or more locations, in which the systems, components, and techniques described in this specification are implemented. The network 116, such as a local area network ("LAN"), wide area network ("WAN"), the Internet, or a combination thereof, connects the configuration system 102, the third party data sources 108, the database 110, and the backup system 114. The configuration system 102, the third party data sources 108, the database 110, the backup system 114, or a combination of these, can each use a single server computer or multiple server computers operating in conjunction with one another, including, for example, a set of remote computers deployed as a cloud computing service.

In some implementations, the backup system 114 can be the same system as the configuration system 102. For example, the configuration system 102 and the backup system 114 can both be implemented as part of a cloud computing system.

Figure 2:
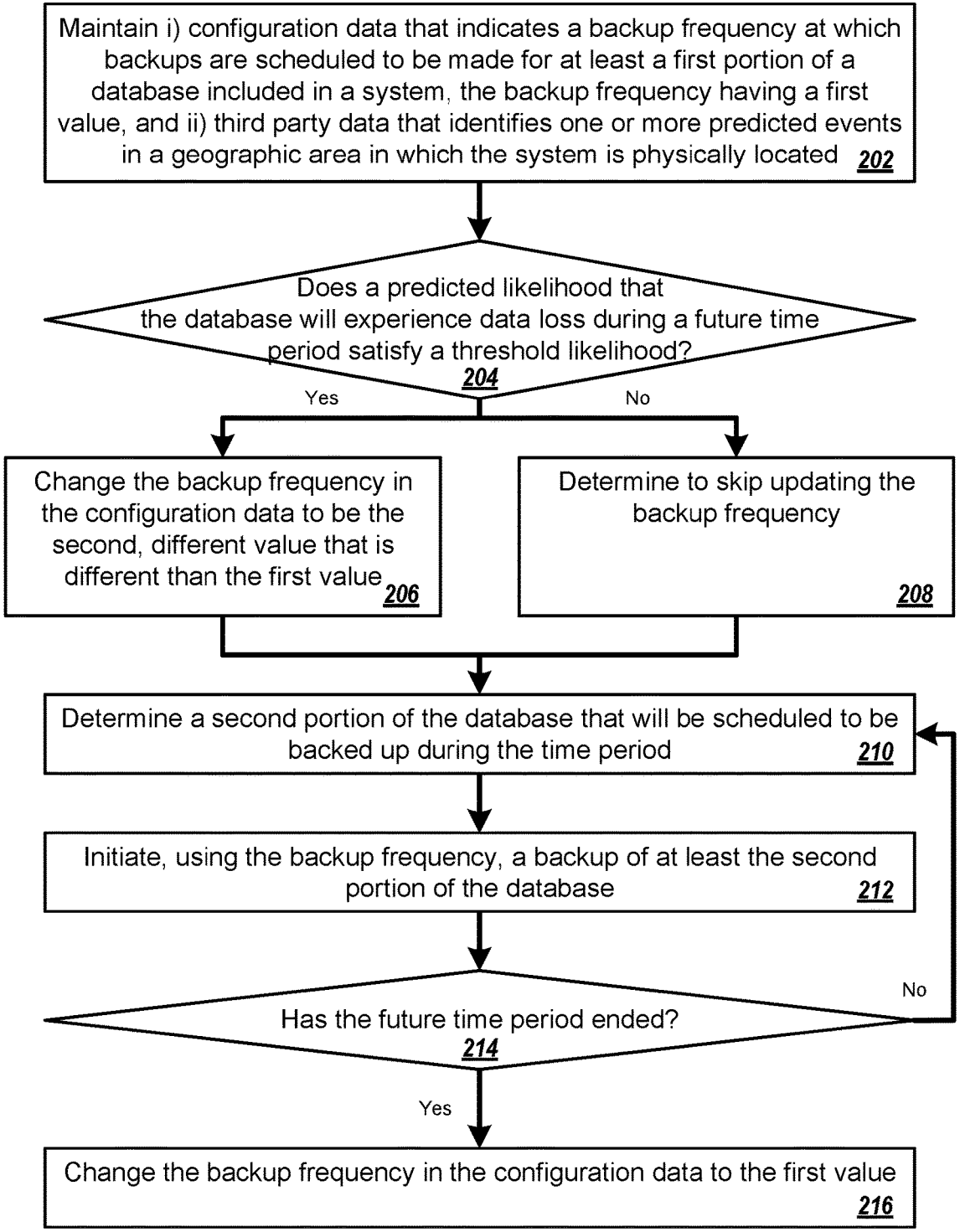
FIG. 2 is a flow diagram of an example process for determining whether to change a backup frequency.

FIG. 2 is a flow diagram of an example process 200 for determining whether to change a backup frequency. For example, the process 200 can be used by the configuration system 102 from the environment 100.

A configuration system maintains i) configuration data that indicates a backup frequency at which backups are scheduled to be made for at least a first portion of a database included in a system, the backup frequency having a first value, and ii) third party data that identifies one or more predicted events in a geographic area in which the system is physically located (202). For example, the configuration system can maintain the configuration data and the third party data in one or more memories included in the configuration system. In some examples, the configuration system can maintain the configuration data in a first memory or a first database while maintaining the third party data in a second memory or a second database.

In some implementations, the first portion of the database is backed up to a backup system prior to the configuration system maintaining the third party data. For instance, the configuration system can maintain the configuration data that indicates the backup frequency with the first value. The database can be backed up at least once, and potentially two or more times, according to the backup frequency with the first value. After the backup, or potentially substantially concurrently with one of multiple backups, the configuration system can receive the third party data. The configuration system can then maintain the third party data.

The configuration system determines whether a predicted likelihood that the database will experience data loss during a future time period satisfies a threshold likelihood (204). For example, the configuration system can determine the predicted likelihood using the third party data. The configuration system can compared the predicted likelihood with the threshold likelihood to determine whether the predicted likelihood satisfies the threshold likelihood.

In some examples, the configuration system can determine a predicted rate of data change to the database during the future time period. The configuration system can compare the predicted rate of data change to a rate of data change threshold. The configuration system can determine whether the predicted rate of data change satisfies the rate of data change threshold using the comparison, e.g., as part of the comparison. When the predicted rate of data change satisfies the rate of data change threshold, the configuration system can determine to change a value for the backup frequency.

In some implementations, the predicted likelihood can represent the predicted rate of data change. For instance, the configuration system can determine the predicted likelihood that represents both the likelihood that the database will experience data loss during the future time period and the predicted rate of change for data on the database during the future time period. The predicted rate of change can be an average rate of change.

The configuration system changes the backup frequency in the configuration data to be the second, different value that is different than the first value (206). For instance, the configuration system can change the backup frequency in response to determining that the predicted likelihood satisfies the threshold likelihood. The configuration system can change the backup frequency using the third party data, metric data for the database, configuration data for the database, or a combination of two or more of these. The configuration data for the database can be data that indicates a minimum backup frequency, a maximum backup frequency, a size of the database or a data subset on the database, an importance of data on the database or a data subset on the database, a data type for data stored in the database, or a combination of two or more of these.

The first value or the second value can indicate a higher frequency of backups. For example, the first value can indicate a first schedule at which backups are made less frequently than a second schedule indicated by the second value. In some examples, the first value can indicate a first schedule at which backups are made more frequently than a second schedule indicated by the second value.

The configuration system determines to skip updating the backup frequency (208). For instance, the configuration system can determine to skip updating the backup frequency in response to determining that the predicted likelihood does not satisfy the threshold likelihood. In some implementations, instead of or in addition to determining to skip updating the backup frequency, the configuration system can determine to maintain the backup frequency at a current value.

In some examples, the configuration system performs either step 206 or step 208 when performing the process 200, e.g., and not both steps 206 and 208. In some examples, when the configuration system performs the process 200 multiple times, for different databases, different third party data, different portions of databases, or a combination of two or more of these, the configuration system can perform step 206 during some iterations of the process 200 and step 208 during other iterations of the process 200.

When determining to skip updating the backup frequency, the configuration system can determine to maintain the first value for the backup frequency, e.g., in memory. After determining to skip updating the backup frequency, the configuration system can initiate a backup using the first value for the backup frequency, wait to receive additional third party data, or perform another appropriate step in the process 200, e.g., step 210, or another appropriate process.

The configuration system determines a second portion of the database that will be scheduled to be backed up during the time period (210). For instance, the configuration system can determine whether the updated second, different value for the backup frequency will be applied to the entire first portion of the database, e.g., when the first portion and the second portion are the same portion, or to a subset of the first portion, e.g., when the second portion is a proper subset of the first portion. In some examples, the second portion can be a portion that includes all of the first portion and at least some additional data other than data from the first portion of the database. The second, different portion can be a portion that the configuration system determines is most frequently used, most important, or both.

In some examples, the second portion of the database does not include the first portion of the database. In these examples, the configuration system can change the backup frequency by creating a new schedule for the second portion that has the second, different value for the backup frequency. In this way, the configuration system can dynamically determine to create backups for a second portion for which there was not previously a backup, or for which there was not previously a backup schedule.

The configuration system initiates, using the backup frequency, a backup of at least the second portion of the database (212). The configuration system can initiate the backup using the appropriate value for the backup frequency, e.g., depending on whether the configuration system performed step 206 or 208.

In some examples, the configuration system can initiate one or more backups of the database using the first value for the backup frequency before initiating a backup of the database using the second, different value for the backup frequency. For instance, the configuration system can wait until the future time period and then initiate a backup of the database using the second, different time period. The configuration system can change the value for the backup frequency to the second, different value, upon detection that the future time period began. While waiting until the future time period, the configuration system can initiate one or more backups using the first value for the backup frequency. Any other appropriate system, including the database, can initiate the backups of the database.

The configuration system determines whether the future time period ended (214). For instance, the configuration system can maintain, with the configuration data, a predicted start time, a predicted end time, a duration, or a combination of these, for the future time period. The configuration system can determine when the future time period begins using the predicted start time.

In some examples, the configuration system can maintain an identifier for the event. The configuration system can determine when the future time period begins when the configuration system receives second third party data that indicates that the future time period is beginning or about to begin. The configuration system can analyze the second third party data and determine that the second third party data is associated with the identifier. The identifier can be any appropriate identifier, such as the name of a weather event. When the configuration system determines that the second third party data is associated with the identifier and indicates that the future time period is beginning or about to begin, the configuration system can determine that the future time period has begun.

The configuration system can use the predicted end time, the duration along with the predicted start time, or third party data that indicates the end of the future time period to determine that the future time period has ended. For instance, when using a duration, the configuration system can initiate a timer when the future time period begins. The configuration system can determine that the future time period has ended when the timer expires. The third party data that indicates the end of the future time period can be data that identifies the event and indicates that the event has ended.

The configuration system changes the backup frequency in the configuration data to the first value (216). For example, the configuration system can change the backup frequency back to the first value in response to determining that the future time period has ended. The configuration system can use the first value to initiate a backup of the first portion of the database.

When the configuration system determines that the future time period has not ended, the configuration system can maintain the second, different value for the backup frequency. For instance, the configuration system can maintain the second, different value for the backup schedule for the database, e.g., for the second portion of the database. The configuration system can use the second, different value to initiate a second backup of the second portion of the database.

The order of steps in the process 200 described above is illustrative only, and determining whether to change the backup frequency can be performed in different orders. For example, the configuration system can determine the second portion of the database and then change the backup frequency. The configuration system can, substantially concurrently, change the backup frequency and determine the second portion of the database.

In some implementations, the process 200 can include additional steps, fewer steps, or some of the steps can be divided into multiple steps. For example, the configuration system can receive the third party data and then maintain the third party data. The configuration system can perform steps 204, 206, 210, and, optionally, step 212 without performing the other steps in the process 200. In some examples, the configuration system can perform steps 204, 208, 212, and, optionally, step 202 without performing the other steps in the process 200.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:
   maintaining, by a first system, i) configuration data that indicates a backup frequency at which backups are scheduled to be made for at least a portion of a database included in a second system, the backup frequency having a first value, and ii) third party data that identifies one or more predicted events in a geographic area in which the second system is physically located;
   determining, using the third party data, whether a predicted likelihood that the database will experience data loss during a future time period satisfies a threshold likelihood and the first system should change the first value for the backup frequency to a second, different value;
   in response to determining that the predicted likelihood satisfies the threshold likelihood and the first system should change the first value for the backup frequency to a second, different value:
      determining the second, different value for the backup frequency at which backups will be scheduled to be made during the future time period, wherein the second, different value indicates a different backup frequency than the first value;
      identifying, using the third party data that identifies the one or more predicted events and from two or more non-overlapping memory sub-portions of the portion of the database included in the second system, a first sub-portion for which to change the backup frequency, the portion including at least the first sub-portion and a second, different sub-portion;
      determining whether to selectively change the backup frequency in the configuration data to be the second, different value that is different than the first value or determine to skip updating the backup frequency;
      in response to determining to selectively change the backup frequency in the configuration data to be the second, different value that is different than the first value, changing, for the first sub-portion and the future time period, the backup frequency in the configuration data to be the second, different value that is different than the first value;
      determining to skip updating the backup frequency for the second, different sub-portion from the two or more non-overlapping memory sub-portions of the database and to maintain, for the future time period, the first value for the backup frequency for backups of the second, different sub-portion; and
      after determining the second, different value for the backup frequency at which backups will be scheduled to be made during the future time period, initiating, using the backup frequency that has the second, different value, a backup of the first sub-portion of the database; and
      initiating, during the future time period and using the first value and the second, different value for the backup frequency, a second backup of the first sub-portion and the second, different sub-portion of the database.

2. The method of claim 1, comprising:
   determining that the future time period has ended; and
   in response to determining that the future time period has ended, changing, for the first sub-portion, the backup frequency in the configuration data to the first value.

3. The method of claim 1, wherein determining whether the predicted likelihood satisfies the threshold likelihood comprises determining, using the third party data, the second, different value.

4. The method of claim 1, comprising:
   determining, using the third party data and one or more historical rates of data change to data in the database during one or more prior time periods including a most recent historical rate of data change for a most recent prior time period, a predicted rate of data change to data in the database during the future time period; and
   determining whether the predicted rate of data change to the data in the database satisfies a rate of data change threshold that is not satisfied by the most recent historical rate of data change for the most recent prior time period,
   wherein determining the second, different value for the backup frequency at which backups will be scheduled to be made during the future time period is responsive to determining that the predicted rate of data change satisfies the rate of data change threshold and determining that the predicted likelihood satisfies the threshold likelihood.

5. The method of claim 1, wherein the first value indicates a first schedule at which backups are made less frequently than a second schedule indicated by the second, different value.

6. The method of claim 1, wherein:
   determining whether the first system should change the first value for the backup frequency to a second, different value comprises:
      determining, using the third party data, whether the predicted likelihood that the database will experience data loss during the future time period satisfies the threshold likelihood;
      determining, using the third party data, a predicted access rate to data in the database during the future time period; and
      determining whether the predicted access rate to data in the database satisfies an access rate threshold; and
   determining the second, different value for the backup frequency at which backups will be scheduled to be made during the future time period is responsive to determining that the predicted access rate to data in the database satisfies the access rate threshold.

7. The method of claim 1, wherein identifying the first sub-portion for which to change the backup frequency and determining whether to selectively change or determine to skip updating the backup frequency use a portion selection threshold that is satisfied by the first sub-portion and is not satisfied by the second, different sub-portion.

8. The method of claim 4, wherein determining the predicted rate of data change comprises determining that a rate of data change to data in the database will likely change from the most recent historical rate of data change to the predicted rate of data change during the future time period.

9. A system comprising one or more computers and one or more storage devices on which are stored instructions that are operable, when executed by the one or more computers, to cause the one or more computers to perform operations comprising:

maintaining i) configuration data that indicates a backup frequency at which backups are scheduled to be made for at least a portion of a database included in a second system, the backup frequency having a first value, and ii) third party data that identifies one or more predicted events in a geographic area in which the second system is physically located;

determining, using the third party data, whether a predicted likelihood that the database will experience data loss during a future time period satisfies a threshold likelihood and the system should change the first value for the backup frequency to a second, different value;

in response to determining that the predicted likelihood satisfies the threshold likelihood and the system should change the first value for the backup frequency to a second, different value:

determining the second, different value for the backup frequency at which backups will be scheduled to be made during the future time period, wherein the second, different value indicates a different backup frequency than the first value;

identifying, using the third party data that identifies the one or more predicted events and from two or more non-overlapping memory sub-portions of the portion of the database included in the second system, a first sub-portion for which to change the backup frequency, the portion including at least the first sub-portion and a second, different sub-portion;

determining, for each of the first sub-portion and the second, different sub-portion, whether to selectively change the backup frequency in the configuration data to be the second, different value that is different than the first value or determine to skip updating the backup frequency;

in response to determining, for the first sub-portion, to selectively change the backup frequency in the configuration data to be the second, different value that is different than the first value, changing, for the first sub-portion and the future time period, the backup frequency in the configuration data to be the second, different value that is different than the first value;

in response to determining, for the second, different sub-portion, to not selectively change the backup frequency in the configuration data to be the second, different value that is different than the first value and to skip updating the backup frequency, determining to skip updating the backup frequency for the second, different sub-portion from the two or more non-overlapping memory sub-portions of the portion of the database and to maintain, for the future time period, the first value for the backup frequency for backups of the second, different sub-portion; and after determining the second, different value for the backup frequency at which backups will be scheduled to be made during the future time period:

initiating, using the backup frequency that has the second, different value, a backup of the first sub-portion of the database; and initiating, using the backup frequency that has the first value, a backup of the first sub-portion of the database.

10. The system of claim 9, the operations comprising:
determining that the future time period has ended; and
in response to determining that the future time period has ended, changing, for the first sub-portion, the backup frequency in the configuration data to the first value.

11. The system of claim 9, wherein determining whether the predicted likelihood satisfies the threshold likelihood comprises determining, using the third party data, the second, different value.

12. The system of claim 9, the operations comprising:
determining, using the third party data and one or more historical rates of data change to data in the database during one or more prior time periods including a most recent historical rate of data change for a most recent prior time period, a predicted rate of data change to existing data in the database during the future time period; and
determining whether the predicted rate of data change to the data in the database satisfies a rate of data change threshold that is not satisfied by the most recent historical rate of data change for the most recent prior time period,
wherein determining the second, different value for the backup frequency at which backups will be scheduled to be made during the future time period is responsive to determining that the predicted rate of data change satisfies the rate of data change threshold and determining that the predicted likelihood satisfies the threshold likelihood.

13. The system of claim 9, wherein the first value indicates a first schedule at which backups are made less frequently than a second schedule indicated by the second, different value.

14. The system of claim 9, wherein initiating the backup comprises initiating the backup of at least the first sub-portion of the database that includes the portion of the database.

15. The system of claim 9, wherein:
determining whether the system should change the first value for the backup frequency to a second, different value comprises:
determining, using the third party data, whether the predicted likelihood that the database will experience data loss during the future time period satisfies the threshold likelihood;
determining, using the third party data, a predicted access rate to data in the database during the future time period; and
determining whether the predicted access rate to data in the database satisfies an access rate threshold; and
determining the second, different value for the backup frequency at which backups will be scheduled to be made during the future time period is responsive to determining that the predicted access rate to data in the database satisfies the access rate threshold.

16. The system of claim 9, the operations comprising initiating, during the future time period and using the first value and the second, different value for the backup frequency, a second backup of the first sub-portion and the second, different sub-portion of the database.

17. At least one non-transitory computer storage medium encoded with instructions that, when executed by one or more computers included in a system, cause the one or more computers to perform operations comprising:
maintaining i) configuration data that indicates a backup frequency at which backups are scheduled to be made for at least a portion of a database included in a second system, the backup frequency having a first value, and ii) third party data that identifies one or more predicted events in a geographic area in which the second system is physically located;

determining, using the third party data, whether a predicted likelihood that the database will experience data loss during a future time period satisfies a threshold likelihood and the one or more computers should change the first value for the backup frequency to a second, different value;

in response to determining that the predicted likelihood satisfies the threshold likelihood and the system should change the first value for the backup frequency to a second, different value:

determining the second, different value for the backup frequency at which backups will be scheduled to be made during the future time period, wherein the second, different value indicates a different backup frequency than the first value;

identifying, using the third party data that identifies the one or more predicted events and from two or more non-overlapping memory sub-portions of the portion of the database included in the second system, a first sub-portion for which to change the backup frequency, the portion including at least the first sub-portion and a second, different sub-portion;

determining, for each of the first sub-portion and the second, different sub-portion, whether to selectively change the backup frequency in the configuration data to be the second, different value that is different than the first value or determine to skip updating the backup frequency;

in response to determining, for the first sub-portion, to selectively change the backup frequency in the configuration data to be the second, different value that is different than the first value, changing, for the first sub-portion and the future time period, the backup frequency in the configuration data to be the second, different value that is different than the first value;

in response to determining, for the second, different sub-portion, to not selectively change the backup frequency in the configuration data to be the second, different value that is different than the first value and to skip updating the backup frequency, determining to skip updating the backup frequency for the second, different sub-portion from the two or more non-overlapping memory sub-portions of the portion of the database and to maintain, for the future time period, the first value for the backup frequency for backups of the second, different sub-portion; and after determining the second, different value for the backup frequency at which backups will be scheduled to be made during the future time period:

initiating, using the backup frequency that has the second, different value, a backup of the first sub-portion of the database; and initiating, using the backup frequency that has the first value, a backup of the first sub-portion of the database.

18. The computer storage medium of claim 17, the operations comprising:

determining that the future time period has ended; and in response to determining that the future time period has ended, changing, for the first sub-portion, the backup frequency in the configuration data to the first value.

19. The computer storage medium of claim 17, the operations comprising:

determining, using the third party data and one or more historical rates of data change to data in the database during one or more prior time periods including a most recent historical rate of data change for a most recent prior time period, a predicted rate of data change to data in the database during the future time period; and determining whether the predicted rate of data change to the data in the database satisfies a rate of data change threshold that is not satisfied by the most recent historical rate of data change for the most recent prior time period, wherein determining the second, different value for the backup frequency at which backups will be scheduled to be made during the future time period is responsive to determining that the predicted rate of data change satisfies the rate of data change threshold and determining that the predicted likelihood satisfies the threshold likelihood.

20. The computer storage medium of claim 17, wherein determining whether the system should change the first value for the backup frequency to a second, different value comprises:

determining, using the third party data, whether the predicted likelihood that the database will experience data loss during the future time period satisfies the threshold likelihood;

determining, using the third party data, a predicted access rate to data in the database during the future time period; and determining that the predicted access rate to data in the database satisfies an access rate threshold.

* * * * *